United States Patent [19]

Jakobsen

[11] 4,320,083

[45] Mar. 16, 1982

[54] PROCESS OF PREPARING REINFORCED CONTAINER

[75] Inventor: Kjell M. Jakobsen, Skanör, Sweden

[73] Assignee: Platmanufaktur AB, Malmo, Sweden

[21] Appl. No.: 168,206

[22] Filed: Jul. 10, 1980

Related U.S. Application Data

[62] Division of Ser. No. 18,190, Mar. 7, 1979.

[30] Foreign Application Priority Data

Mar. 13, 1978 [SE] Sweden ................................. 7802815

[51] Int. Cl.³ .............................................. B29D 23/03
[52] U.S. Cl. ................................... 264/531; 215/1 C; 264/25; 264/521; 264/523; 428/35
[58] Field of Search ................. 264/521, 531, 25, 523; 215/1 C; 428/35

[56] References Cited

U.S. PATENT DOCUMENTS 3,125,619 3/1964 Miller .
3,256,564 6/1966 Welshon .
4,024,975 5/1977 Uhlig .................. 215/1 C
4,151,249 4/1979 Lee ...................... 264/521
4,170,622 10/1979 Uhlig .................. 264/530
4,179,488 12/1979 Nishikawa ........... 264/521

FOREIGN PATENT DOCUMENTS 957624 11/1974 Canada .
2211307 9/1973 Fed. Rep. of Germany .
1214626 4/1960 France .
1214387 12/1970 United Kingdom .
1236432 6/1971 United Kingdom .

Primary Examiner—James H. Derrington
Attorney, Agent, or Firm—Hane, Roberts, Spiecens & Cohen

[57] ABSTRACT

A process of producing a reinforced container of thermoplastic material in which a blank is pre-heated from an amorphous structure and finished in a subsequent blowing process with biaxial stretching, wherein it is provided simultaneously with internal reinforcing ribs.

10 Claims, 12 Drawing Figures

PROCESS OF PREPARING REINFORCED CONTAINER

This is a division of application Ser. No. 018,190, filed Mar. 7, 1979.

FIELD OF THE INVENTION

This invention relates to a process for manufacturing a reinforced container of thermoplastic material, wherein a blank is heated from an amorphous structure and finished in a subsequent blowing process accompanied by biaxial stretching, and provided at the same time with internal reinforcing ribs.

PRIOR ART

A process of this type is known from U.S. Pat. No. 4,024,975. According to this patent, a container with ribs on the inner surface and a smooth outer surface suitable for labelling is produced by providing two blowing processes whereby, in the first blowing process, a pre-formed blank is provided with external ribs by being formed in a mold comprising grooves, said ribs being transformed into ribs on the inner surface of the container in a second blowing process using an internally smooth mold. This process is costly and necessitates two blow molds instead of one and, consequently, two pre-heating processes. Furthermore, it is not possible when using this process to make the material at the ribs of a, denser, structure than the other parts of the blow-molded wall of the container. The ribs, consequently, provide only a strengthening of material in volume, while the physical properties of same remain unchanged.

SUMMARY OF THE INVENTION

An object of the invention is to provide a process which is free from the drawbacks of those known hitherto. It is intended thereby to improve the physical properties of the finished container and to succeed in providing, apart from concentric reinforcing rings, which tend to produce an unwanted concertina effect, strips in a "caterpillar" pattern, axially orientated strips and ribs parallel to the container axis to serve as internal reinforcements. Particularly in the case of containers for the storage of pressurized fluids, e.g. beverages containing carbon dioxide, a change in volume between pressurized and non-pressurized condition is undesirable.

The container is produced by a process comprising subjecting the zone of subsequent reinforcement ribs of the blank, before the blowing process, to locally confined treatment designed to alter the structure of the material, said alteration in structure leading to crystallization of the amorphous structure and/or an alteration in the density of the material. In the subsequent blowing process or during the associated biaxial stretching, the reinforcing ribs are formed, adjacent to the untreated, non-densified zones, from the denser material structure, said reinforcing ribs forming owing to a lesser degree of expansion in the material of the container taking shape in the smooth blow mold. The particular advantage of this process is not only that it is possible to dispense with separate formation of the ribs in an individual operation but also that the above structural alteration of the material enables a variety of different forms of reinforcement to be obtained, e.g. networks, and ribs running parallel to the axes, in a very simple manner. The principle of a structural change in a thermoplastic material can, indeed, be ascertained from the state of the art, for example from British Pat. Nos. 1,214,387 and 1,236,432. These patents however, do not suggest using said type of structural change to form reinforcements on a container during the blowing process.

In a further embodiment of the invention, local treatment is effected to alter the structure of the blank material either by exerting mechanical pressure, for example by stamping, or by heat treatment. Heat can consist of local radiation with infrared light or with light having a wavelength of less than 320 m$\mu$. Preferably, the light should have wavelengths of 310 microns or 280–285 m$\mu$.

The heat treatment can, however, also be effected using heat conduction, in which case a hot body with locally projecting portions is applied to the blank.

In the case of pressure treatment, however, the wall thicknesses of the blank should be locally reduced, by 10–60%, preferably by 25–35%. A disk can thereby be rolled against the blank under pressure.

In the treatment according to the invention, the blank is driven in rotation synchronously and the locally restricted treatment for structural alteration is effected on the inner walls and/or the external surfaces of the blank.

It is very important to select the material correctly from a range of thermoplastics with high fusion temperatures. The blank can be formed using polyester or polyamide or other polymer materials of a similar type and supplied to the blowing process below the fusion temperature and at a temperature in excess of the glass transition temperature.

According to the invention, a blank is produced from amorphous material, the strength of the material of the blank being enhanced within certain zones in that crystallization within the same is increased. This is effected by mechanical effects and/or heat treatment. The increased strength is evidenced by the increased density of the material. A blank treated in this way is blow molded to form a container, the material in the walls of the blank being at a temperature in excess of that of the glass transition temperature. The zones in the blow molded container corresponding to the treated zones of the blank constitute, after blow molding, the reinforcements in the walls of said container. The following relationship is necessary between crystallization and density:

$$\frac{\alpha}{100} \quad \frac{\rho}{\rho_{cryst.} - \rho_{amorph.}} - \frac{\rho_{amorph.}}{\rho_{cryst.} - \rho_{amorph.}}$$

wherein:
  $\alpha$ = crystallization in percent
  $\rho$ = density for percent crystallization
  $\rho$ cryst. = density for 100% crystallization
  $\rho$ amorph. = density for amorphous condition.

The relationship is consequently linear. When orientating the material, for example, by biaxial stretching in the blowing process, an increase in density is also obtained, the density increase being given by the stretching ratio. The orientated material is stronger than the non-orientated material.

When manufacturing containers of the above mentioned material in accordance with the invention, the dimensions of the pre-formed blank or of the container are selected in such a way that the major part of the material in the pre-formed blank is biaxially stretched by more than 1.5 times in the subsequent blowing, preferably approximately 3 times. The result of the above-described treatment of the pre-formed blank is to enhance the strength of the material within certain portions which form for example rings, strips in a "caterpillar" pattern, axially orientated strips or linear zones, etc.

The pre-shaped blank is pre-heated to a temperature somewhat in excess of that of the glass transition temperature and subsequently, for example, blown in a mold so that the pre-formed blank expands to such an extent that it touches the walls of the mold. The non-treated portions of the walls are stretched less than the treated portions, with the result that the formed container comprises thinner and thicker wall portions. The thicker wall portions form reinforcements and increase the strength and inherent stability of the blow molded container.

In the mechanical treatment of the pre-formed blank, a relatively flat groove thereon corresponds to the thicker wall portions of the container. The side that is thereby exposed to mechanical stresses on the pre-formed blank, rises in principle above the surrounding area, while the opposite side on the finished container is, in general, perfectly flat. In the event of the score (groove) being located in the external surfaces of the pre-formed blank, the shape of the mold into which the pre-shaped blank is blown, is altered so that the blown container is provided with wall portions whose outer surfaces are substantially raised above the surrounding zones. The thicker wall portions, on the other hand result in a hollowing out of the internal faces of the blow molded container.

In the case of a relatively deep groove, this will be matched by thicker wall portions on the container. The side on which there was a depression in the pre-shaped blank will also be matched on the container by a depression, whereas the opposite side of the walls will be generally raised above the surrounding material. The effect of the mold against which the container is blown, naturally applies also to this form of embodiment. The density within the treated zones is normally greater for the finished container than in the adjacent regions.

A container produced in accordance with the above described process will therefore possess wall portions with better physical properties than the adjacent wall portions. These wall portions are generally thicker than the surrounding portions. They represent a reinforcement of the container and impart thereto greater resistance to deformation than that of a container with homogeneous wall material. The reinforcements take the form, for example, of annular strips of a rib network, partially or completely covering the container. They are placed alternatively on the inner or outer surface of the container or pass through and include the full wall thickness of the container.

DETAILED DESCRIPTION

Figure 1:
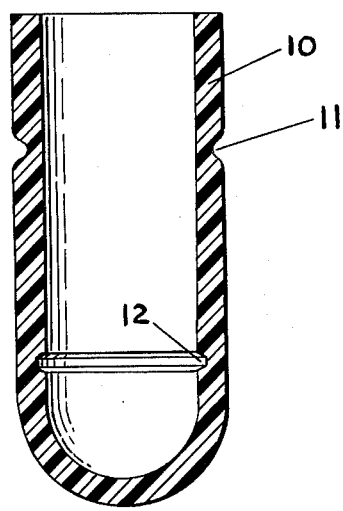
FIG. 1 is a sectional view of a pre-formed blank provided with depressions.

FIG. 1 shows a blank or pre-formed blank, 10, in which depressions 11, 12 have been stamped. One of said depressions consists of a deep hollow, 11, and the other of a shallow hollow, 12. The depressions are illustrated in detail in FIGS. 2 and 3. Generally speaking, the shape of the depressions does not affect the end result. The depressions can thus have, for example, flat oblique surfaces, more or less inclined in relation to the outer surface. The bottom faces of the depressions can also be plane. The aspect naturally depends on the shape of the stamping tool used. The essential feature in application of the object of the invention resides in the fact that the properties of the material in the walls of the pre-formed blank can be modified by mechanical effects to a pre-determined extent.

Figure 2:
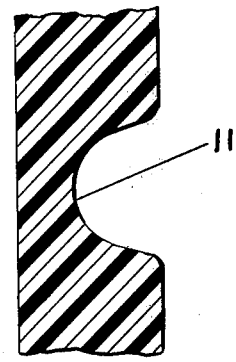
FIGS. 2 and 3 are enlarged views of details of those portions in which said depressions are found.
Figure 3:
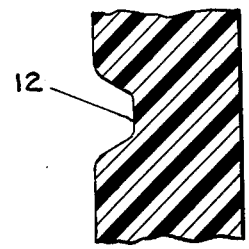

FIGS. 1 to 3 show the deep constriction (depression) located on the outer face of the pre-formed blank and the shallow constriction located on the inner face of said blank. This design is naturally optional and the deep depression might just as conveniently be disposed in the inner face and the shallow depression correspondingly in the outer face.

The depressions have been obtained by having the pre-formed blank subjected to the action of a mechanical system, e.g. a disk, with the result that the material in the pre-formed blank has yielded to the mechanical device and a depression has formed in the material. This mechanical treatment of the pre-shaped blank is preferentially effected when the material of the blank is below its glass transition temperature.

Figure 4:
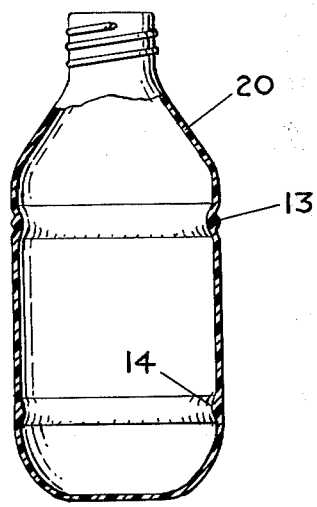
FIG. 4 is an elevational view, partly broken away and in section, of a finished container according to the invention.

FIG. 4 shows a finished container 20 produced from a pre-formed blank 10. It is to be noted that there are differing scales for FIGS. 1 and 4 and the change in volume between the pre-shaped blank in FIG. 1 and the finished container in FIG. 4 is, in reality, greater than is apparent from the figures.

Figure 5:
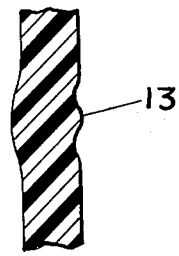
FIGS. 5 and 6 are enlarged sectional views of zones of the finished container in which the reinforcements according to the invention are located.

The deep indentation 11 in pre-formed blank 10 is matched on finished container 20 by a strip-like zone 13 (cf. FIG. 5), characterized in that the material on the outer side of the wall is depressed to a certain extent in relation to the surrounding material, while the material on the inner side of the wall is raised in relation to the surrounding material. The indentation (depression) on the outer face of the wall easily assumes an undulating aspect, for instance the shape represented in FIG. 5. When the pre-shaped blank is re-formed to constitute the finished container, the deep depression, forming an annular depression in the pre-shaped blank, is altered to such an extent that only a very slight uneveness is to be found on the outer face of the container, whereas the inner face of the container features a substantial hump-like protuberance. By comparison with the surrounding material, the strip-like annular portion also has a greater wall thickness.

Figure 6:
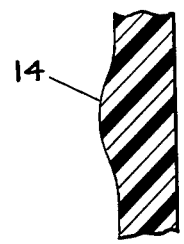

The shallow depression 12 on the pre-shaped blank 10 is matched on finished container 20 by a strip-like zone 14 (see FIG. 6), characterized in that the outer face of the wall is perfectly flat and shows no alteration, e.g. in the form of a protuberance or depression. On the other hand, the inner face of the wall does have a hump-like protuberance, which means that the wall thickness in the strip-like zone formed is greater than the wall thickness in the surrounding zone.

When the pre-shaped blank is re-modelled, therefore, thicker wall portions are formed on the finished container from thinner wall portions on the blank.

Figure 7:
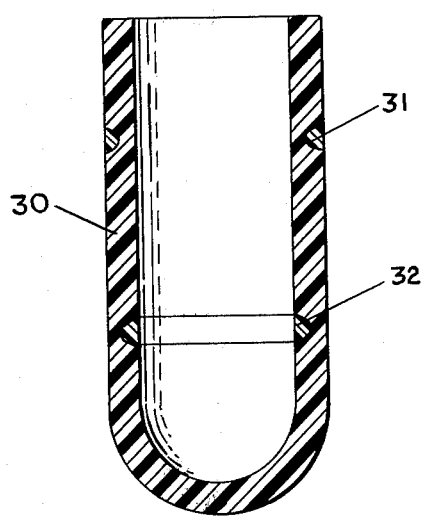
FIG. 7 is a sectional view of a pre-formed blank with certain wall portions affected by the application of heat.

FIG. 7 illustrates a pre-shaped blank 30 exposed to heat treatment. This treatment can be effected, for example, by direct radiation or by bringing a hot mandrel, a hot ring or other mechanical arrangement of members into contact with the desired parts of the pre-formed blank. FIG. 7 specially illustrates two zones of this type, namely zone 31 located in the outer face of the blank, and zone 32 located in the inner face of said blank.

Figure 8:
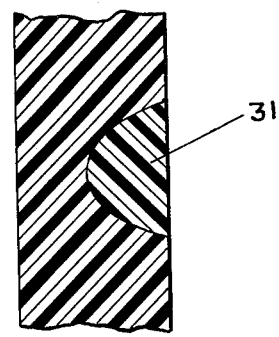
FIGS. 8 and 9 are enlarged views of the zones affected by the application of heat.
Figure 9:
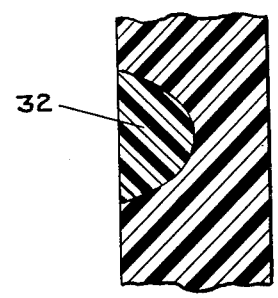

FIGS. 8 and 9 show the extent of the zones in detail. Naturally, a treated zone and a non-treated zone cannot, in reality, be so precisely delimited from one another as in said figures. In practice, there is, of course, a gradual (progressive) transition between treated and non-treated zones. The depth of the zone naturally depends entirely upon the effect applied (energy absorbed) and upon the energy.

Figure 10:
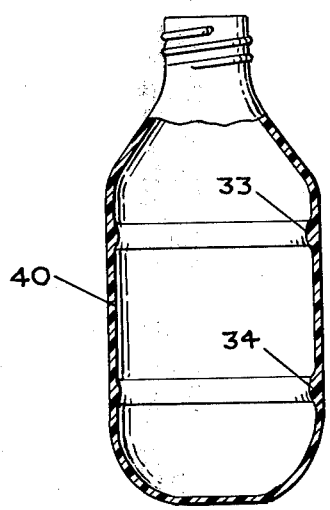
FIG. 10 is an elevational view, partly broken away and in section, of a finished container in which a pre-formed blank according to FIG. 7 has been used.

FIG. 10 shows a finished container 40 produced from pre-shaped blank 30. Strip-like zones 33, 34 are once again to be found in the region of the finished container corresponding to the heat treated zones 31, 32 on the pre-shaped blank.

Figure 11:
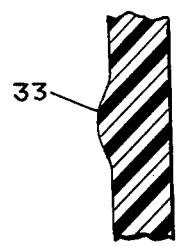
FIGS. 11 and 12 are enlarged views of the zones of the finished container according to FIG. 10.
Figure 12:
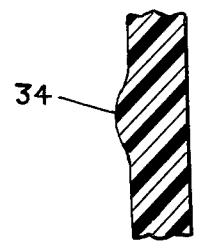

FIGS. 11 and 12 show individually how the strip-like zone is formed from a thicker part of the finished wall of the container. The wall thickness of the strip-like zones in the finished container is determined by the extent to which the material in the corresponding zones of the pre-shaped blank is heated.

The drawings show a number of embodiments of the invention. These have been preferentially selected in order to illustrate the invention as simply as possible. It goes without saying that the object of the invention permits of a wide range of alternative embodiments other than those specifically disclosed herein. The invention is not limited to the disclosure only of annular reinforcements but also provides for complete freedom of choice as regards the location, orientation and extent of the reinforcements. This freedom of choice also applies to increasing the wall thickness and the size of the depressions (indentations).

The invention also contemplates pre-treating or preparing the pre-shaped blank in such a way that certain parts thereof are not modified upon re-modelling into the finished container. This is achieved by altering the material properties of the pre-shaped blank to such an extent that the physical properties of the material zones affected are so reinforced that they have no tendency to stretch when the pre-shaped blank is re-modelled. In this way it is possible to obtain containers with substantial soffits or other desired rienforcing features or features relating to the aspect of the containers.

The container can for example be prepared from polyethylene terephthalate, polyhexamethylene adipamide, polycaprolactam, polyhexamethylene sebacamide, polyethylene-2,6 and 1,5 naphthalate, polytetramethylene-1,2 dioxybenzoate and copolymers of ethylene terephthalate and ethylene iosphthalate.

I claim:

1. A process for the manufacture of a container of thermoplastic material comprising rapidly cooling a blank produced by extrusion or injection molding to form an amorphous structure, and reheating the blank while blowing the blank to effect biaxial stretching, said blank being subjected before said blowing to localized treatment in a zone to modify the structure of the material and produce subsequent reinforcing ribs on the container, the modification of the structure in said zone leading in the subsequent blowing and biaxial stretching operation to a lesser degree of expansion of the material in said zone and the formation of said ribs of a denser material structure in relation to the remainder of said container and wherein said ribs are formed as humped protuberances providing increasing thickness of the container in the wall thereof at said ribs and wherein said wall has an outer continuous surface at said ribs, said localized treatment being a mechanical treatment to form annular recesses in said blank, said ribs being formed at said recesses after said reheating and blowing.

2. A process according to claim 1 wherein said localized treatment for modifying the structure of the material of the blank comprises applying mechanical pressure below the glass transition temperature of the blank.

3. A process according to claim 2 wherein said pressure reduces the wall thickness of the blank locally by 10 to 60%.

4. A process according to claim 2 or 3 wherein the pressure is applied to the blank via a plate rolled under pressure against the blank.

5. A process according to claim 1 comprising rotating said blank and effecting said localized treatment in rotational synchronism with the rotation of the blank.

6. A process according to claim 1 wherein said blank has inner and outer surfaces and said localized treatment is effected on one of said surfaces.

7. A process according to claim 6 wherein said localized treatment produces an increase in density of the material of the blank in said zone in entirety between the inner and outer surfaces of the blank.

8. A process according to claim 1 wherein said blank is constituted of a material selected from the group consisting of polyethylene terephthalate, polyhexamethylene adipamide, polycaprolactam, polyhexamethylene sebacamide, polyethylene-2,6 and 1,5 naphthalate, polytetramethylene-1,2 dioxybenzoate and copolymers of ethylene terephthalate and ethylene isophthalate.

9. A process according to claim 1 wherein said blank is at a temperature below the fusion temperature and at a temperature in excess of the glass transition temperature at the commencement of said blowing operation.

10. A process according to claim 1 wherein said mechanical treatment comprises stamping said blank to form said recesses.

* * * * *